No. 845,879. PATENTED MAR. 5, 1907.
W. R. MAY.
CLUTCH.
APPLICATION FILED APR. 20, 1906.
2 SHEETS—SHEET 1.
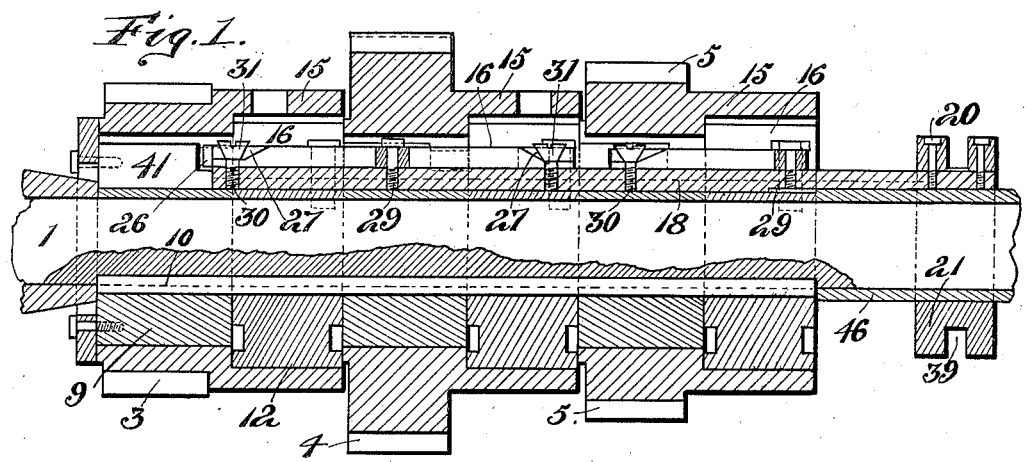
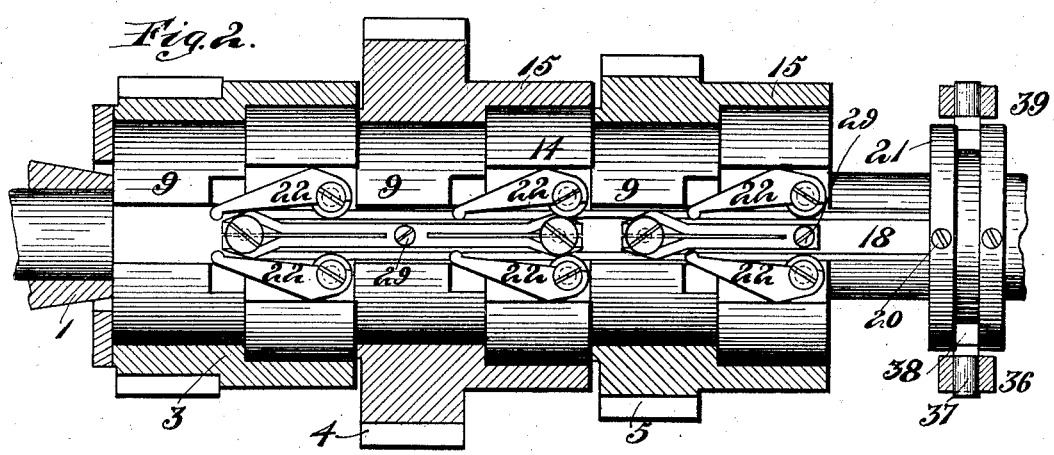
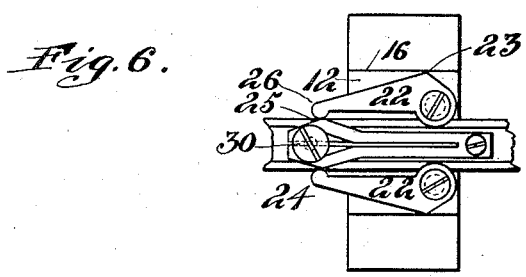
Witnesses
Inventor
W. R. May
By Wright, Brown, Quinby & May
Attorneys

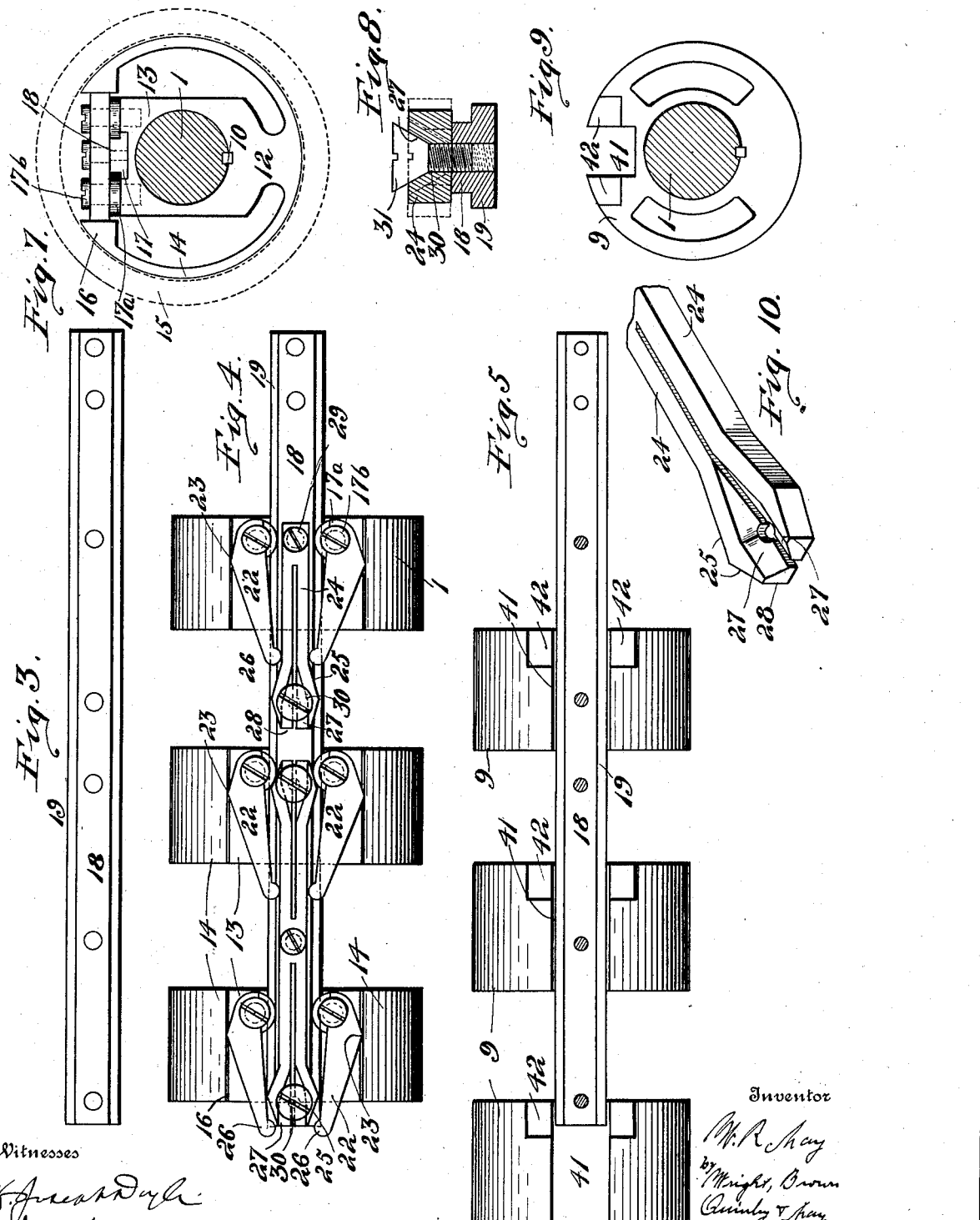

UNITED STATES PATENT OFFICE.

WILLIAM R. MAY, OF NEWTON, MASSACHUSETTS.

CLUTCH.

No. 845,879.  Specification of Letters Patent.  Patented March 5, 1907.

Original application filed January 27, 1906, Serial No. 298,212. Divided and this application filed April 20, 1906. Serial No. 312,826.

*To all whom it may concern:*

Be it known that I, WILLIAM R. MAY, of Newton, in the county of Middlesex and State of Massachusetts, have invented certain new and useful Improvements in Clutches, of which the following is a specification.

This invention relates to clutches; and its object is to provide a friction-clutch for detachably uniting gears, pulleys, shaft-couplings, or other contrivances, which may be loosely mounted upon shafts, to the shafts.

The present invention consists of a clutch which is described in connection with a variable-speed gearing in an application for patent filed by me January 27, 1906, Serial No. 298,212, of which this case is a division.

The essential features comprise expansible members which are mounted within a hub or flange of a loose wheel and are expanded against their resiliency into contact with the hub or flange by means of levers acted upon by wedges moved in the direction of the shaft. When the wedges are moved away from the levers the resiliency of the expansible members separates them from frictional contact with the wheel. By the construction and arrangement of wedges and levers a great multiplication of force is obtainable for securing a tight frictional hold of the clutch members.

Of the accompanying drawings, Figure 1 represents a section of a plurality of clutches containing the principles of my invention mounted on a single shaft. Fig. 2 represents an elevation or plan of the expansible clutch members, showing in section the wheels with which they are adapted to engage. Figs. 3, 4, and 5 represent detail views of the clutches and operating means therefor which detachably connect wheels to the shaft. Fig. 6 represents a fragmentary view showing the position of one of the clutch-operating devices when the clutch members are in frictional engagement. Fig. 7 represents an elevation of one of the clutches. Fig. 8 represents a section showing one of the adjustable clutch-operating wedges. Fig. 9 represents an end elevation of one of the hubs or collars on which the loose wheels are held. Fig. 10 represents a perspective view of a portion of one of the wedges.

The same reference characters indicate the same parts in all the figures.

Referring to the drawings, 1 represents a shaft which is adapted to be rotated by any suitable means. (Not shown.) Upon the shaft 1 are wheels 3, 4, and 5, of which there may be one or any number of the same or of varying sizes and of any desired character—such as gears, pulleys, &c. These wheels are centrally bored and are mounted to rotate loosely upon hubs or collars 9, secured to the shaft 1 by a key 10. These hubs rotate with the shaft, while the wheels turn idly or stand still except when clutched to the shaft.

In order to connect the wheels one at a time with the shaft, I provide friction-clutches 12, which are located upon the shaft between the hubs 9 and are caused to turn therewith by the key or spline 10 above referred to. These clutches have hub portions 13 immediately surrounding the shaft and extending therefrom resilient friction-arms 14, the outer surfaces of which are cylindrical and lie within and close to the inner surfaces of sleeves 15, of which one projects laterally from each wheel and constitutes one member of each clutch-coupling. The friction-arms terminate in shoulders 16 adjacent a square side of the hub 13, in which side is formed a guideway 17, through which passes a long bar 18, having flanges 19 in its lower side projecting under collars 17$^a$ at the sides of the guideways, said collars being formed on the screws 17$^b$. The bar 18 extends through the whole space occupied by all the clutches and somewhat beyond the endmost clutch, being secured by screws 20 to a collar 21 on the shaft.

Pivoted to that side of the hub 13 in which is the guideway 17 are levers 22, which on their outer sides and intermediate their ends are formed with angular protuberances 23, forming relatively sharp corners or edges which bear against the shoulders 16 of the friction-arms 14. Each clutch carries two of these levers, one of which is on each side of the bar 18. Between the levers 22 of each pair is a bar 24, having inclined sides 25, forming wedges, which when the bar is moved endwise enter between the free ends 26 of levers 22 and spread them apart, causing the bearing knife-edges 23 to press against the friction-arms 14 and spring the latter outward into engagement with the sleeve 15. The widened portions of the wedge-bars 24 are tapered in both directions, so that they will act when moving in either direction.

The wedge-bars 24 are made of hard resilient metal and are split throughout the greater portion of their length, providing on each two arms which may be pressed more or less apart by suitable means. As shown in the drawings, the enlarged portions of these bars having the inclined sides 25 are adjacent the ends, and the dividing slot or kerf is tapered so that the adjacent sides 27 of the arms 28, into which the wedge-bar is divided, are inclined away from each other in an outward direction from the motor-bar 18. The wedge-bar is secured to the motor-bar by screws 29 30 near the opposite ends of the former, and the screw 30 has an enlarged conical head 31, the sides of which engage the inclined walls 27. Thereby as the screw is driven a greater or less distance into the motor-bar 18 the arms 28 are separated more or less and the wedge correspondingly widened or contracted. On account of the adjustability of the wedges the amount of pressure which the clutch-arms are adapted to exert against the sleeves 15 of the gears may be varied and the frictional engagement made as tight or as loose as desired.

The means for operating the clutches consists of studs 37, to which are secured bars 38, extending into circumferential grooves 39 in the collars 21. Movement of the studs 37 through a yoke 36 from any external source of power causes the collar 21 to be moved endwise on the shaft, thereby moving the bar 18 endwise.

For convenience and economy of space and of the number of parts the wedges which actuate the clutches for gears 3 and 4 may be made in one piece, each end of this wedge-bar being enlarged and provided with the adjusting-screw 30, while the non-adjusting screw 29 is located at the middle of the bar. Each hub 9 is provided with a channel 41, parallel with its axis, through which the motor-bar 18 passes, and also with recesses 42 on each side of the channel into which the ends of the clutch-actuator-levers project.

In the construction described above where wedges act upon the long arms of levers which have shorter arms engaging the clutches to set them in operation great mechanical power may be applied to the expansible members of the clutches with but little expenditure of force. The expenditure of force is further diminished by the character of the bearing which the levers have against the clutch members, this being, as above described, between the edges 23 and the faces 16 of the friction-arms. Each edge bears upon a very small area, which is hardly more than a straight line, and is therefore almost infinitesimal. Thus knife-edge bearings are provided by which friction is practically eliminated.

Although a number of clutches are shown in the accompanying drawings placed close together upon a single shaft, I desire it to be understood that there is no necessity of having more than one clutch on a shaft and also that any number greater than that illustrated may be mounted upon the same shaft with any desired arrangement. I desire it also to be understood that the clutch hereinbefore described is applicable to any machine and in any relation in which clutches are ordinarily or may be used.

I claim—

1. In combination with a shaft and a wheel loosely mounted thereon, a clutch intermediate the wheel and shaft, an actuator movable in the direction of the length of the shaft, a lever pivoted adjacent thereto, and an adjustable lateral projection on the actuator arranged to engage said lever and move the same to cause connection of the clutch with the wheel.

2. The combination of a shaft, a wheel loosely mounted thereon, a clutch member intermediate the wheel and shaft, an actuator movable in the direction of the length of the shaft, a lever pivoted adjacent thereto having an angular projection engaging the clutch member and movable to press against the same on a line non-radial to the pivot, and a lateral projection on the actuator arranged to engage said lever when the actuator is moved and force the projection of the lever against the clutch to thereby cause connection of the same with the wheel.

3. The combination of a shaft, a wheel loosely mounted thereon and provided with a lateral recess, a clutch member secured to the shaft and having an arm within said recess adapted to be moved into engagement with the wall thereof, a lever pivoted to the body of the clutch and bearing against the arm thereof on a line passing outside of its pivot, and an actuator movable into contact with the lever to thereby force the same against the clutch-arm, and the latter against the wheel.

4. The combination of a shaft, a wheel loosely mounted thereon and provided with a lateral recess, a clutch member secured to the shaft and having an arm within said recess adapted to be moved into engagement with the wall thereof, a lever pivoted to the body of the clutch and bearing against the arm thereof, and an actuator movable lengthwise of the shaft and provided with a lateral protuberance having inclined sides adapted to move past and come into contact with the lever from either direction to thereby force the same against the clutch-arm, and the latter against the wheel.

5. The combination of a shaft, a wheel loosely mounted thereon and provided with a lateral recess, a clutch secured to the shaft and having an arm within said recess adapted to be moved into engagement with the wall thereof, a lever pivoted to the body of the clutch and bearing against the arm thereof, an actuator movable lengthwise of the shaft and provided with a lateral protuberance having inclined sides adapted to come into contact with the lever to thereby force the same against the clutch-arm, and the latter against the wheel, and means for varying the lateral extent of said protuberance, whereby the engaging pressure between the clutch-arm and wheel may be varied.

6. The combination of a shaft, a wheel loosely mounted thereon and formed with a lateral recess, a clutch having a hub secured to the shaft and arms extending on both sides thereof within the recess and adapted to engage the wall thereof, levers pivoted to the hub between the ends of the clutch-arms, each formed with an angular projecting portion engaging one of the arms, and an actuator between said levers movable lengthwise, carrying wedge members adapted to engage said levers and force them apart, to thereby expand the clutch-arms into engagement with the wheel.

7. The combination of a shaft, a wheel loosely mounted thereon and formed with a lateral recess, a clutch having a hub secured to the shaft and arms extending on both sides thereof within the recess and adapted to engage the wall thereof, levers pivoted to the hub between the ends of the clutch-arms, each formed with an angular projecting portion engaging one of the arms, an actuator between said levers movable lengthwise carrying wedge members adapted to engage said levers and force them apart, to thereby expand the clutch-arms into engagement with the wheel, a collar movable longitudinally on the shaft to which said actuator is connected, and means for moving said collar.

8. In a clutch, an adjustable clutch-actuating wedge member consisting of a bar having on opposite sides inclined faces and divided longitudinally, and means for separating the divided sides.

9. In a clutch, a clutch-actuator consisting of a motor-bar and a wedge-bar secured thereto having separated, inclined sides resiliently joined together and movable apart.

10. In a clutch, a clutch-actuator consisting of a motor-bar, a wedge-bar secured thereto having separated, inclined sides resiliently joined together and movable apart, and a screw threaded into the motor-bar between the separable sides of the wedge-bar adapted to adjust the amount of separation thereof.

11. In a clutch, a clutch-actuator consisting of a motor-bar, a wedge-bar secured thereto and partially divided longitudinally, having inclined faces on the outer sides of the divided portion, and a screw threaded into the motor-bar between said inclined faces for separating the same.

12. In a clutch, a clutch-actuating wedge consisting of a bar divided through a part of its length having wedge-faces on the outer sides of the separated portions and divergent faces on the adjacent inner sides of said portions.

In testimony whereof I have affixed my signature in presence of two witnesses.

WILLIAM R. MAY.

Witnesses:
A. C. RATIGAN,
P. W. PEZZETTI.